Sept. 20, 1966
F. M. HAGQUIST ET AL
3,273,611
LATHE CENTERS
Filed July 13, 1964
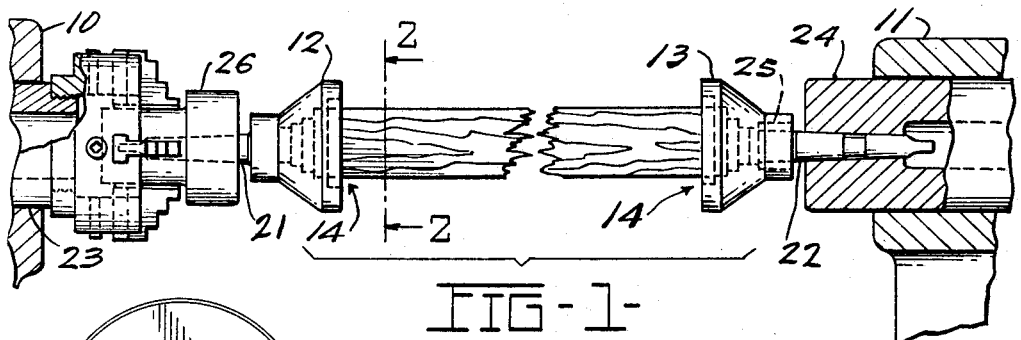
FIG-1-
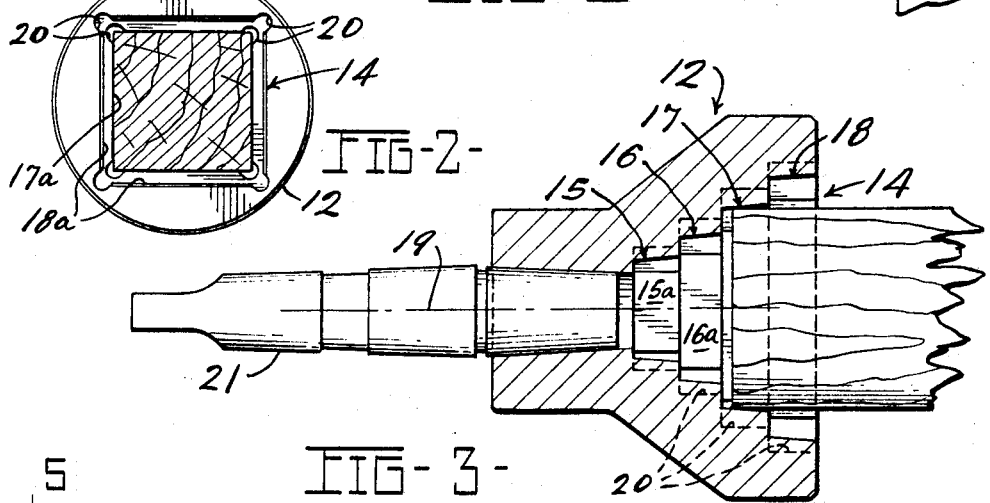
FIG-2-
FIG-3-
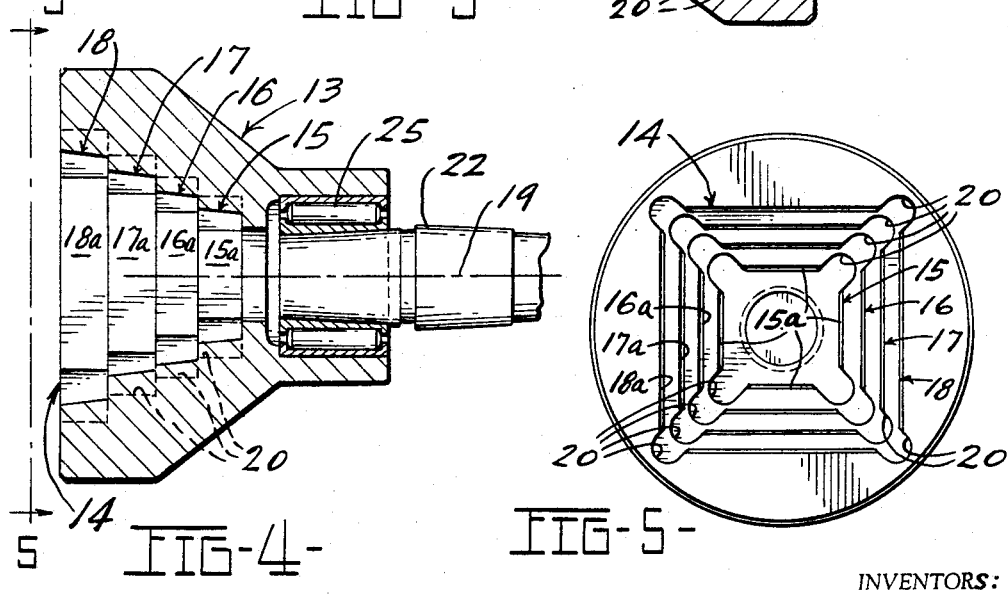
FIG-4-
FIG-5-
INVENTORS:
FREDERICK M. HAGQUIST,
ARTHUR E. VAN EPPS.
BY
ATT'YS.

United States Patent Office 3,273,611
Patented Sept. 20, 1966

3,273,611
LATHE CENTERS
Frederick M. Hagquist, Toledo, and Arthur E. Van Epps, Dayton, Ohio, assignors to The Freeman Supply Company, Toledo, Ohio, a corporation of Ohio
Filed July 13, 1964, Ser. No. 382,059
4 Claims. (Cl. 142—53)

The present invention relates to automatic work centering lathe centers for square stock and more particularly to lathe centers which will automatically center and drive various standard sizes of square wood turning stock.

An object of the present invention is the provision of new and improved means for automatically centering and driving stock of generally square cross section in a lathe.

Another object of the invention is the provision of new and improved means for automatically centering and driving stock in a lathe which has a smooth contour so that there are no projections on which the clothing of an operator could become entangled.

A further object of the invention is the provision of new and improved means of the above-mentioned type which can be quickly installed in a conventional lathe, and when so installed, will automatically provide a driving connection for square workpieces and will accurately center the work relative to the axis of rotation of the lathe.

Further objects and advantages of the invention will become apparent to those skilled in the art to which it relates from the following description of the preferred embodiment described with reference to the accompanying drawings in which:

FIG. 1 is an elevational view showing the preferred embodiment of the invention installed in the head and tail stock of a lathe and supporting a workpiece to be turned;

FIG. 2 is a sectional view taken along the line 2—2 of FIG. 1;

FIG. 3 is a fragmentary sectional view showing a portion of the part of the preferred embodiment which is installed in the head stock of a lathe;

FIG. 4 is a fragmentary view, with portions in section, of the part of the invention installed in the tail stock of a lathe; and FIG. 5 is an end view taken from a position indicated by the line 5—5 of FIG. 4.

The means shown in the drawings for automatically centering work material of square cross section in a head stock 10 and tail stock 11 of a lathe generally comprises head and tail housings 12 and 13 which are substantially identical in construction. Those portions of housings 12 and 13 which are identical are designated in the drawings by like reference numerals. The housings 12 and 13 each have axially extending stepped recesses 14 having flat sides and, preferably, comprising a plurality of generally square stepped portions. Any number of stepped portions can be provided and, in the embodiment shown in the drawings, four portions 15, 16, 17 and 18, are shown. Each stepped portion 15, 16, 17 and 18 has four side abutment surfaces 15a, 16a, 17a and 18a. The stepped portions 15–18 and the recess 14 are centered with respect to the longitudinal axis 19 of the housing. The abutment surfaces of the stepped portions 15, 16, 17 and 18 are preferably spaced to correspond to standard sizes of square stock to be turned in the lathe. The abutment surfaces 15a, 16a, 17a and 18a are preferably tapered outwardly of the recess 14, as shown in FIGS. 3 and 4, so that the ends of the stock can be wedged thereagainst.

Inasmuch as it is desirable to apply the driving power to the workpiece through the flat sides thereof, and the present invention establishes a good wedging fit between the sides of the workpiece and the abutment surfaces 15a, 16a, 17a or 18a, the corners between the abutment surfaces are relieved or recessed radially, as indicated by reference numeral 20 in FIGS. 2 and 5, to accommodate the material at the corners. Thus, no driving force will be applied to the corners of the workpiece, and any deformation thereof will be avoided.

Each of the head and tail housings 12 and 13 is provided with an axially extending shaft 21 and 22, respectively, for chucking into driving engagement with a head spindle 23 and support by a tail quill 24, respectively. The housing 12 is rigidly fixed to the shaft 21, and the housing 13 is rotatably journaled on the shaft 22 by a suitable antifriction bearing 25. The shafts 21 and 22 of the preferred embodiment are each provided with a self-holding taper, such as a Morse taper, which wedges into a mating taper in an adapter 26 which is placed in the chuck carried by the head stock spindle 23 and a mating taper in the tail quill 24, respectively, to automatically center the abutment surfaces of the housings 12 and 13 relative to the axis 19 of the lathe. If desired, the adapter 26 may be eliminated and the drive shaft 21 received directly in the conventional chuck carried in the head stock spindle 23. The taper on the shaft 21 provides a driving connection, while the taper on the shaft 22 provides a nonrotatable connection with the quill 24, with the tail housing 13 free to turn thereon.

The apparatus described above is used by inserting the shaft 21 either directly into a chuck driven by the head spindle 23 of a lathe or into an adapter 26 that is driven by the spindle through the chuck. The shaft 22 is inserted into the quill 24 on the tail stock 11 of the lathe. One end of a piece of material of standard polygonal cross section, corresponding generally with one of the stepped portions 15, 16, 17 and 18 of the head and tail housing members 12 and 13, is wedged into the appropriate stepped portion 15–18 of either of the head or tail housing members 12 or 13. The tail stock 11 is then moved into position and the quill 24 moved toward the head stock 10 with the other end of the workpiece properly aligned with the corresponding stepped portion 15–18 of the other one of the head or tail housings 12 or 13. The opposite ends of the workpiece then become wedged in the tapered abutment surfaces 15a, 16a, 17a or 18a in both housing members 12 and 13, so that the workpiece is automatically centered with respect to the axis of rotation 19 of the lathe, and is also provided with a driving connection.

The head and tail housings 12 and 13 may have any desired external configuration so long as they do not have radially extending projections which can grip the clothing of an operator of the lathe. In the embodiment shown in the drawings, the housings 12 and 13 are generally conically shaped to keep the mass of the head and tail housings 12 and 13 to a practical minimum.

While the invention has been described as having particular utility for use with wood lathes where the wood stock normally comes in pieces with square cross sections of standard dimensions, it can also be used when machining square bars of other materials.

It will be apparent that the objects heretofore enumerated as well as others have been accomplished, and that there has been provided an automatic work centering means for materials having square cross section, the work abutting surfaces of which are automatically centered with respect to the axis of the lathe when placed in the lathe. It will also be seen that the structure provided eliminates all projections which might grip the clothing of an operator and so provides a measure of safety not found in many prior art devices.

While the invention has been described in considerable detail, it is not intended to be limited to the particular embodiment shown and described, and it is desired to cover hereby all novel adaptations, modifications and ar-

What we claim is:

1. Self-centering lathe centers for square stock comprising: a pair of heads having longitudinally extending axes, each of said heads having an axially extending shaft extending from one end thereof, the end of each of said heads opposite said shaft having an outwardly stepped recess comprising a plurality of generally pyramidal-shaped stepped portions, each of which has at least four side abutment surfaces equally spaced from said axis, said abutment surfaces being tapered outwardly, the shaft on one of said heads being rigidly attached to said one of said heads and being adapted to be centered in the head stock of a lathe, and the shaft on the other of said heads being journaled in said other head for support by the tail stock of said lathe, whereby stock having flat sides is automatically centered when one end is wedged in one of said heads and the other of said heads is wedged upon the other end of the stock.

2. Self-centering lathe centers for square stock comprising: a pair of heads having longitudinally extending axes, each of said heads having an axially extending shaft extending from one end thereof, the end of each of said heads opposite said shaft having an outwardly stepped recess comprising a plurality of generally square stepped portions, each of which has four side abutment surfaces equally spaced from said axis, said abutment surfaces being tapered outwardly, the shaft on one of said heads being rigidly attached to said one of said heads and being adapted to be centered in the head stock of a lathe, and the shaft on the other of said heads being journaled in said other head for support by the tail stock of said lathe, whereby stock of square cross section is automatically centered when one end is wedged in one of said heads and the other of said heads is wedged upon the other end of the stock.

3. Self-centering lathe centers for square stock comprising: a pair of heads having longitudinally extending axes, each of said heads having an axially extending shaft extending from one end thereof, the end of each of said heads opposite said shaft having an outwardly stepped recess comprising a plurality of generally square stepped portions, each of which has four side abutment surfaces equally spaced from said axis, said abutment surfaces being tapered outwardly, the sidewalls of said stepped portions being relieved generally radially outwardly at the corners between side abutment surfaces, the shaft on one of said heads being rigidly attached to and adapted to be centered in the head stock of a lathe, and the shaft on the other of said heads being journaled in said other head for support by the tail stock of a lathe, whereby stock of square cross section is automatically centered when one end is wedged in one of said heads and the other of said heads is wedged upon the other end of the stock.

4. Self-centering lathe centers for square stock comprising: a pair of heads having longitudinally extending axes, each of said heads having an axially extending shaft extending from one end thereof, said shafts having self-holding tapers thereon, the end of each of said heads opposite said shaft having an outwardly stepped recess comprising a plurality of generally square stepped portions, each of which has four side abutment surfaces equally spaced from said axis, said abutment surfaces being tapered outwardly, the shaft on one of said heads being rigidly attached to said one head and being adapted to be centered in the head stock of a lathe, and the shaft on the other of said heads being journaled in said other head for support by the tail stock of a lathe, whereby stock of square cross section is automatically centered when one end is wedged in said one of said heads and the other of said heads adapted to be carried by the tail stock is moved toward the head stock and wedged upon the other end of the stock.

References Cited by the Examiner

UNITED STATES PATENTS

| | | | |
|---|---|---|---|
| 668,830 | 2/1901 | Docnarty et al. | 279—28 |
| 930,077 | 8/1909 | Knobelsdorf | 142—54 |
| 935,143 | 9/1909 | Davis | 82—40 |

WILLIAM W. DYER, Jr., *Primary Examiner.*

W. D. BRAY, *Assistant Examiner.*